United States Patent [19]

Woyach

[11] Patent Number: 5,158,505
[45] Date of Patent: Oct. 27, 1992

[54] GUIDE RING

[75] Inventor: Dennis A. Woyach, Milwaukee, Wis.

[73] Assignee: Rexnord Corporation, Milwaukee, Wis.

[21] Appl. No.: 657,652

[22] Filed: Feb. 19, 1991

Related U.S. Application Data

[63] Continuation-in-part of Ser. No. 603,174, Oct. 25, 1990.

[51] Int. Cl.⁵ .............................................. F16H 55/46
[52] U.S. Cl. ........................................ 474/95; 474/98
[58] Field of Search ................................ 474/95-99, 474/152, 153

[56] References Cited

U.S. PATENT DOCUMENTS

| | | | |
|---|---|---|---|
| 379,946 | 3/1888 | Fee | 474/97 |
| 1,485,621 | 3/1924 | Loefler | 474/98 X |
| 1,887,279 | 11/1932 | Bendit | 474/98 |

Primary Examiner—Thuy M. Bui
Attorney, Agent, or Firm—Michael, Best & Friedrich

[57] ABSTRACT

A split guide ring for use with a split sprocket which is mounted on a shaft and used to support and drive conveyor and drive chains.

33 Claims, 2 Drawing Sheets

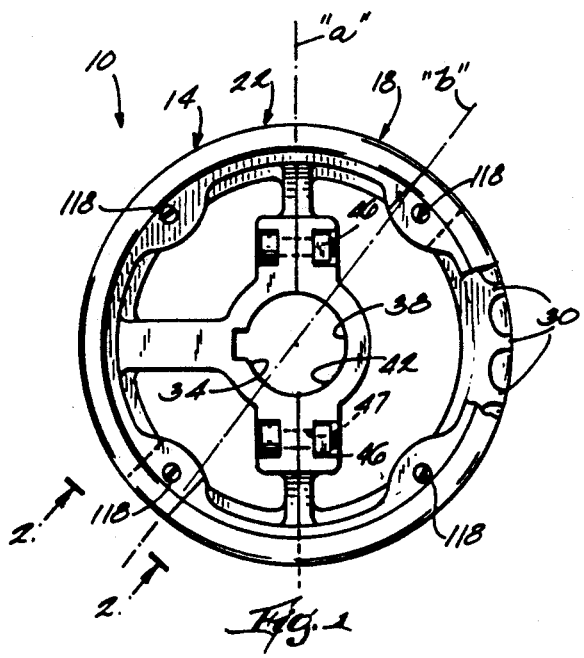
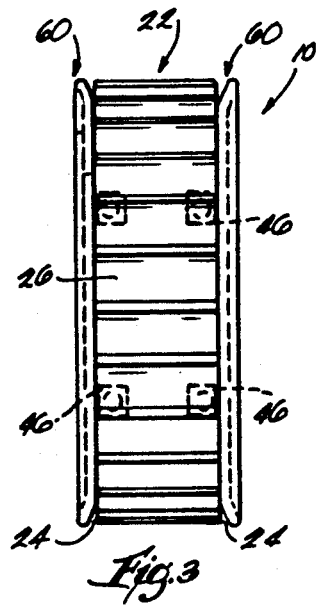
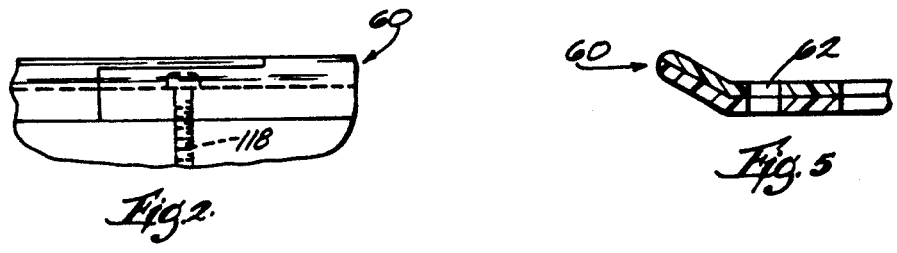
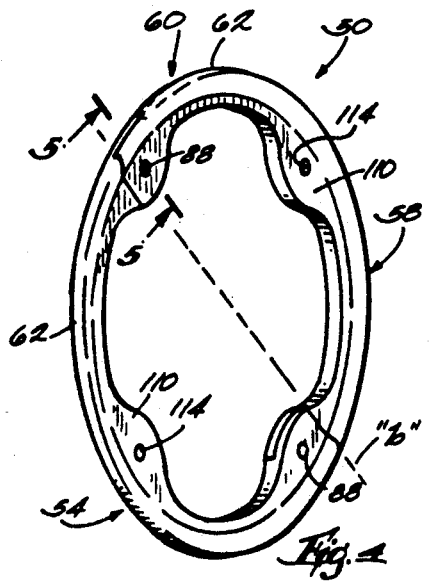
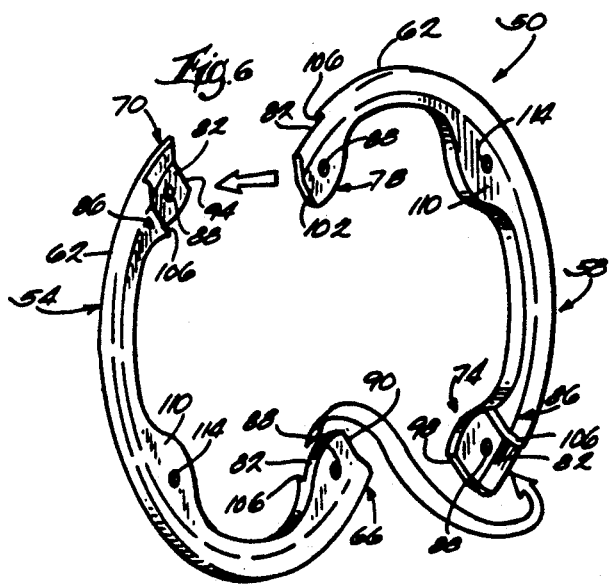

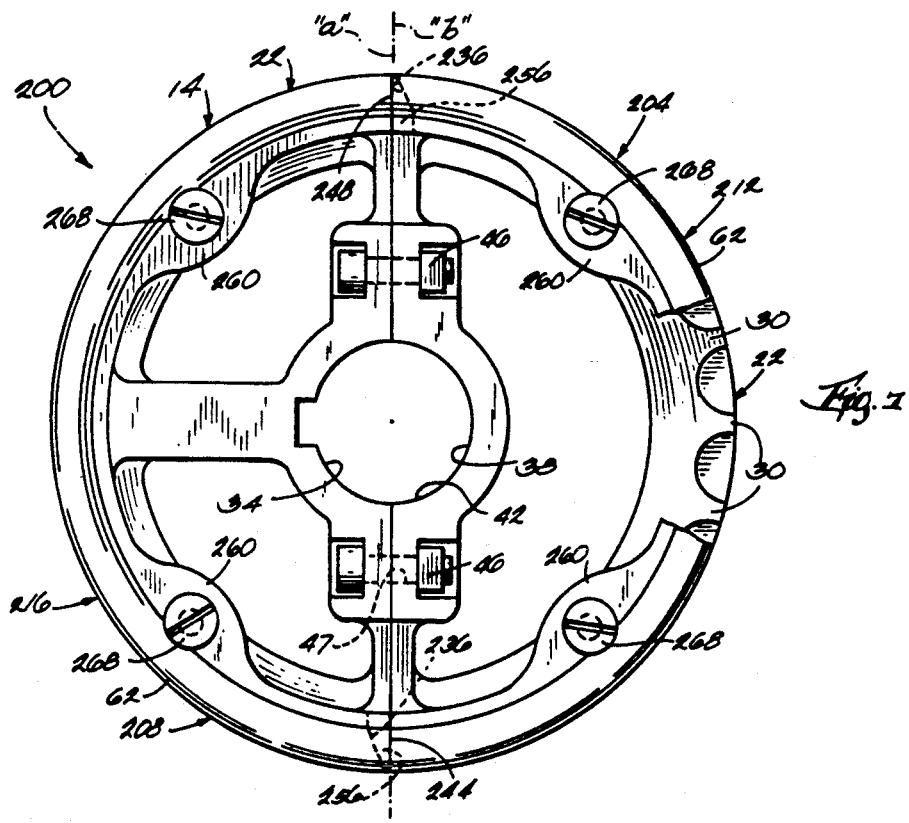
Fig. 7
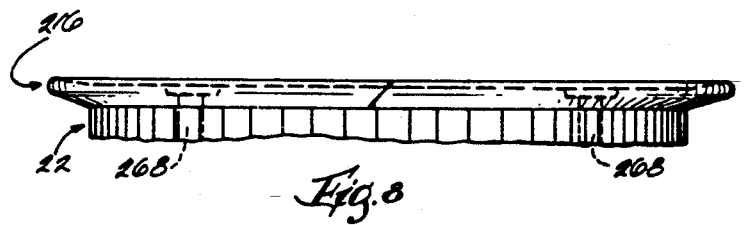
Fig. 8
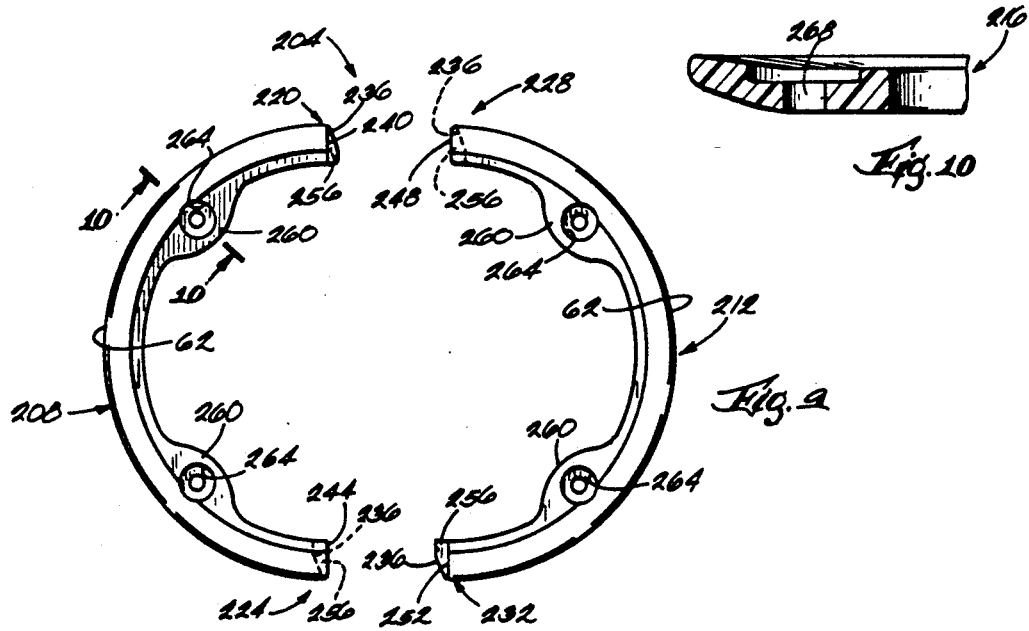
Fig. 9
Fig. 10

GUIDE RING

CROSS REFERENCE TO RELATED APPLICATION

This application is a continuation-in-part of U.S. patent Ser. No. 07/603,174 filed Oct. 25, 1990 entitled "Guide Ring".

BACKGROUND OF THE INVENTION

1. Field of the Invention

This invention relates to sprocket assemblies, and more particularly, to guide rings for sprocket assemblies.

2. Description of the Prior Art

Sprockets used in supporting and driving conveyor and drive chains are commonly mounted on a shaft which is in turn fixed upon bearings at opposite ends of the shaft, the bearings supporting the shaft for rotation. When sprockets of this type wear or need to be replaced, time is required to remove the sprocket because the entire shaft must be removed or dismounted from the conveyor frame so that the sprocket can be pulled off the end of the shaft and a new sprocket can be put into place by sliding the sprocket over the end of the shaft. This can be a costly and time-consuming process.

Split sprockets have been developed in an attempt to alleviate the problems associated with changing a sprocket. These split sprockets comprise one or more sections which can be connected together around the shaft such that the split sprocket can be mounted on and removed from the shaft without removing or dismounting the entire shaft.

Chain conveyors have also included the use of sprockets having circular guide rings, the guide rings being fixed to the opposite sides of the sprocket to maintain alignment of the chain on the sprocket and to prevent the chain from moving laterally with respect to the sprocket. In conveyor chains of the type having an upper surface for supporting conveyed articles, the articles may be pushed laterally off of the chain at the end of the conveyor. Friction between the laterally moving articles and the chain can apply a lateral force on the chain tending to push the chain off of the sprocket.

SUMMARY OF THE INVENTION

The invention provides an improved sprocket assembly for keeping a chain or other element properly aligned as it travels around the sprocket. More particularly, the sprocket assembly includes a sprocket having a circular body which is comprised of at least two separate portions. The sprocket has a periphery including sprocket teeth projecting radially. The sprocket also has a central bore adapted to house a shaft, and the separate portions of the sprocket are separated by a parting line extending through the central bore. Means are also provided for connecting the two sprocket portions together. The sprocket assembly further includes a guide ring assembly comprised of two or more segments which form a guide ring attached to a side of the split sprocket at the periphery of the sprocket.

A principal feature of the invention is a guide ring assembly comprised of identical multiple segments. The guide ring assembly can have a two-piece construction and can be used with a two-piece split sprocket to maintain alignment of a chain on the sprocket as the chain travels around the sprocket. The provision of guide rings is particularly important in conveyor chains which support conveyed articles on their upper surface and wherein these articles are pushed laterally off the chain at the end of the conveyor. The friction between the laterally moving articles and the chain tends to push the chain laterally with respect to the sprocket, and the guide ring will maintain the chain on the sprocket The two-piece guide ring assembly also functions to keep the chain in contact with the sprocket in the event the chain "jumps" and skips over one of the sprocket teeth.

The guide ring assembly embodying the invention is particularly advantageous when utilized with a split sprocket because both the sprocket and guide ring assembly can be removed from a shaft without removing the shaft from the conveyor frame. When a one-piece sprocket and guide ring are mounted on a shaft and the sprocket becomes damaged, the shaft must be removed and the sprocket must be pulled off the end of the shaft. However, a split sprocket and split guide ring can be removed from the shaft without the time-consuming process of dismounting the shaft.

A further advantage of the guide ring assembly embodying the invention is that the guide ring segments can be identical in configuration. This permits more economical molding than a one-piece guide ring. Normally, a single mold can make only one complete one-piece guide ring, and three separate molds would therefore be required to make three different sizes of guide rings. This is not the case when molding a split guide ring embodying the invention. The mold for the split guide ring can have three cavities for molding three different size guide rings, and only one mold is necessary to make three different sizes of split guide rings.

Other principal features and advantages will become apparent to those skilled in the art upon review of the following detailed description, claims and drawings.

BRIEF DESCRIPTION OF THE DRAWINGS

FIG. 1 is a plan, partially broken-away view of a sprocket assembly embodying the invention;

FIG. 2 is a sectional view taken along line 2—2 in FIG. 1;

FIG. 3 is a side view of a sprocket assembly shown in FIG. 1;

FIG. 4 is a perspective view of the guide ring shown in FIG. 1;

FIG. 5 is a sectional view taken along line 5—5 in FIG. 4;

FIG. 6 is an exploded view of the guide ring of FIG. 4;

FIG. 7 is a plan, partially broken-away view of an alternative construction of a sprocket assembly embodying the invention;

FIG. 8 is a side view of the sprocket assembly illustrated in FIG. 7;

FIG. 9 is a perspective view of the guide ring shown in FIG. 7; and

FIG. 10 is a sectional view taken along line 10—10 in FIG. 9.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it shall be understood that the phraseology and terminology used herein is for the purpose of description and shall not be regarded as limiting.

DESCRIPTION OF THE PREFERRED EMBODIMENT

A sprocket assembly 10 embodying the invention is illustrated in the drawings.

The sprocket assembly 10, illustrated in FIGS. 1-6, includes two semi-circular portions 14 and 18 which are connected together to form a sprocket 22 having a circular body including opposite sides and having a periphery 24. The two semi-circular portions 14 and 18 each have an outer surface 26 including sprocket teeth 30 adapted to engage a chain, the sprocket teeth 30 extending radially from that surface 26. The two semi-circular portions 14 and 18 each have respective semi-circular inner surfaces 34 and 38 which define a central opening or bore 42 when the portions 14 and 18 are connected together. The bore 42 is adapted to house a shaft such that the sprocket can be mounted on the shaft. Means are also provided for fixedly connecting the two semi-circular portions 14 and 18 together to form a single sprocket 22. While the two halves of the sprocket could be joined together in other ways, in the illustrated construction bolts 46 are provided, the bolts extending through bores 47 in sprocket halves and clamping the sprocket halves together. When the sprocket halves are assembled, there is a split in the sprocket along parting line "a." While in the illustrated arrangement the sprocket assembly 10 is formed of two pieces, in other arrangements, it could be comprised of three or more components.

The sprocket assembly 10, illustrated in FIGS. 1-6, further includes a guide ring assembly 50. While the guide ring assembly 50 could be comprised of more than two elements or segments, in the specific embodiment of the invention shown in FIGS. 1-6, the guide ring assembly 50 is comprised of a first guide ring portion 54 and a second guide ring portion 58 which form a single guide ring 60, the guide ring portions 54 and 58 being identical. Each of these guide ring portions 54 and 58 have an outer surface 62 which defines an arc of approximately 180°. These guide ring portions 54 and 58 have respective first and second ends, 66 and 70, and 74 and 78. These ends 66, 70, 74 and 78 have identical recessed surfaces 82, the end 66 having a surface 82 which is recessed from the outwardly facing surface 86 of the guide ring 60, and the end 70 have a surface 82 recessed from the inwardly facing surface of the guide ring portion. The recessed surfaces 82 on ends 66 and 70 face in opposite directions, as do the complementary recessed surfaces 82 on ends 74 and 78. The recessed surface 82 on end 78 is shaped to mate with the corresponding recessed surface 82 on end 70 in face-to-face relation. Similarly, the recessed surface 82 on end 66 is shaped to mate with recessed surface 82 of end 74 in face-to-face relation. The joined complementary ends 70, 78 and 66, 74 have a thickness equal to the thickness of the remainder of the guide ring. Each of the ends 66, 70, 74 and 78 contains an aperture 88 extending therethrough. The ends 66, 70, 74 and 78 further have respective end surfaces 90, 94, 98 and 102 at the termination of the ends. A wall or shoulder 106 extends between the recessed surface 82 and the surface 86.

In the specific arrangement shown in FIGS. 1-6, each guide ring portion 54 and 58 further includes an inwardly-extending protrusion 110. This protrusion 110 contains an aperture 114 and is located between the ends of the guide ring portions, approximately half way around the 180° arc.

Although the guide ring portions 54 and 58 have heretofore been described as separate portions, these first and second guide ring portions 54 and 58 are preferably identical. Identical guide ring portions will result in lower tooling and production costs in that only one mold is necessary to make both guide ring portions. Identical guide ring portions also allow the guide ring portions to be easily assembled into a single guide ring.

When the guide ring portions 54 and 58 are assembled to form a single guide ring 60, one end of a first guide ring portion will overlap a complementary end of the second guide ring portion in nested relation while the second end of the first guide ring portion will be positioned in nested relation with the second end of the second guide ring portion. More specifically, as illustrated in FIG. 6, end 66 of the first guide ring portion 54 is positioned over end 74 of the second guide ring portion 58 while end 70 of the first guide ring portion 54 is positioned beneath end 78 of the second guide ring 58. When the guide ring 60 is assembled, each of the end surfaces 90, 94, 98 and 102 engage a wall 106 of the respective adjacent end, and the apertures 88 through each surface 82 are aligned so that a screw 118 or other connecting means can be inserted through the apertures to connect the two guide ring portions 54 and 58 to form a single guide ring 60 and to permit the guide ring assembly to be secured to the side of the periphery of the split sprocket. In the illustrated arrangement the guide ring 60 has a split along line "b." Once the single guide ring 60 has been assembled, it is attached to the periphery 24 of the sprocket 22. The guide ring 60 is attached to the periphery of the sprocket by screws 118 which are inserted through apertures 114 in the guide ring 60 and screws 118 which have been inserted through apertures 88 which extend through the apertures 114 and 88 to communicate with the sprocket. There is preferably a guide ring 60 on the periphery 24 on each side of the sprocket. Further, the guide ring 60 is preferably attached to the periphery of the sprocket such that the split along line "b" in the guide ring is offset from the split along line "a" in the sprocket. In this manner, the guide ring 60 will provide extra support for the sprocket 22.

An alternative embodiment of the guide ring is illustrated in FIGS. 7-10. Since this alternative embodiment of the guide ring is attached to a split sprocket in a similar fashion as guide ring 60, like elements of the split sprocket have been given like reference numbers.

A sprocket assembly 200 is illustrated in FIGS. 7-10. This sprocket assembly 200 includes a sprocket 22 which is identical to sprocket 22 illustrated in FIGS. 1-6. The sprocket assembly 200 further includes a guide ring assembly 204. While the guide ring assembly 204 could be comprised of more than two elements, in the specific embodiment shown in FIGS. 7-10, the guide ring assembly 204 is comprised of a first guide ring portion 208 and a second guide ring portion 212 which form a single guide ring 216. The guide ring portions 208 and 212 are identical and each of these guide ring portions 208 and 212 have an outer surface 216 which defines an arc of approximately 180°. These guide ring portions have respective first and second ends 220 and 224, and 228 and 232. Each of these ends 220, 224, 228 and 232 have an identical beveled surface 236 at their respective end surfaces 240, 244, 248 and 252 which defines an aperture 256 in each of the respective ends.

The apertures 256 are shaped to receive one of the ends of the other guide ring portion. For example, in the construction illustrated in FIG. 9, apertures 256 in ends 228 and 232 of guide ring portion 212 are designed to receive ends 224 and 220 respectively of guide ring portion 208 to form continuous guide ring.

In the embodiment illustrated in FIGS. 7-10, each guide ring portion 208 and 212 includes two inwardly extending protrusions 260. These protrusions 260 each contain an aperture 264 which is adapted to accept a screw.

As is the case with guide ring portions 54 and 58 illustrated in FIGS. 1-6, the guide ring portions 208 and 212 are preferibly identical. Identical guide ring portions will result in lower tooling and production costs because only one mold is necessary to make both guide ring portions. Identical guide ring portions also allow the guide ring portions to be easily assembled into a single guide ring.

When the guide ring assembly 204 has been assembled into a single guide ring 216 as previously described, the guide ring 216 has a split along line "b". This guide ring 216 is then attached to the periphery of the sprocket by screws 268 which are inserted through apertures 264 to communicate with the sprocket. There is preferably a guide ring 216 on the periphery on each side of the sprocket. Further, the guide ring is preferably attached to the periphery of the sprocket such that the split along line "b" in the guide ring is aligned with the split along line "a" in the sprocket.

In normal operation, the sprocket assembly 10 or 200 is rotatably mounted to a shaft which is fixed at both ends (not shown). The shaft extends through the bore 42 in the sprocket assembly. A chain or other flexible drive or conveyor element extends over the teeth 30 of the sprocket and wraps around the sprocket. During this operation, the guide rings 60 or 216 help to guide the chain onto the sprocket by engaging the sides of the chain and to maintain the chain centered on the sprocket, keeping the chain from drifting back and forth on the sprocket.

The provision of guide rings 60 or 216 is particularly important in conveyor chain applications where articles supported by the chain are transferred from the chain to an area at the side of the chain as the chain approaches the sprocket. As the articles are being pushed laterally off of the chain, a lateral load is placed on the chain by the articles as they are pushed off the chain. Guide rings help to keep the chain on the sprocket during this process.

In some applications or circumstances a conveyor or drive chain will occasionally stretch and may "jump" over one of the sprocket teeth as the chain links move around the sprocket. Guide rings will function to keep the chain aligned on the sprocket in these instances.

In the event the sprocket assembly 10 becomes damaged or needs to be replaced, it can be removed from the shaft without dismounting the sprocket shaft from the conveyor frame The sprocket assembly 10 illustrated in FIGS. 1-6 is removed from the shaft by first removing the screws 118 from apertures 114 and thereby removing the guide ring assembly from the sprocket assembly. The bolts 46 are removed to permit separation of the two portions 14 and 18 of the split sprocket assembly. The two portions 54 and 58 of the guide ring 60 and the two portions 14 and 18 of the sprocket 22 can then be separated from one another and then lifted free from the shaft. In a like manner, the sprocket assembly can be mounted to the shaft without dismounting the shaft.

The sprocket assembly 200 illustrated in FIGS. 7-10 does not require separation of the guide ring assembly 204 from the sprocket 22 prior to removing the sprocket assembly 200 from the shaft. Since the split "b" in the guide ring assembly 204 is aligned with the split "a" in the sprocket 22, the removal of bolts 46 which join the sprocket halves together is all that is necessary to remove the sprocket assembly from the shaft. Once bolts 46 are removed, guide ring assembly 204 and the split sprocket 22 can be removed from the shaft together, as one piece. Once the sprocket and guide ring portion have been removed from the shaft, the guide ring portion can be removed from the sprocket by removing screws 268 from apertures 264.

Although the sprocket 22 and guide rings 60 and 216 have been heretofore described as having two portions, this invention is not limited to sprockets and guide rings having two portions. It is only necessary that the sprocket be capable of opening or coming apart so that it can be removed from the shaft without dismounting the shaft. Accordingly, the sprocket could be comprised of one portion or many portions. The same rationale is true for the guide ring, although in the preferred embodiment of the invention the guide ring is comprised of two identical portions.

Various features of the invention are set forth in the following claims.

I claim:

1. A sprocket assembly comprising
   a split sprocket having a generally circular configuration, the sprocket including an outer surface having a plurality of spaced apart teeth adapted engage a chain, the sprocket including a central bore adapted to house a shaft such that the sprocket can be mounted on the shaft, the sprocket being formed from at least two sprocket portions split along a line extending through the central bore, and the sprocket including opposite sides, the opposite sides each having a periphery; and
   a split guide ring assembly fixed to one of the opposite sides of the sprocket and adjacent the periphery of said one of the opposite sides, the guide ring assembly being adapted to restrain the chain on the sprocket and, the split guide ring assembly including at least two segments.

2. A sprocket assembly as set forth in claim 1 wherein the segments of the split guide ring assembly are each semi-circular and include opposite ends, and wherein the segments are joined together to form a circular guide ring assembly.

3. A sprocket assembly as set forth in claim 1 wherein the segments of the split guide ring assembly each have opposite ends, one opposite end of one segment being adapted to be joined to an end of an adjacent segment in overlapping nested relation.

4. A sprocket assembly as set forth in claim 3 and further including a fastener extending through said opposite end of one segment and said end of an adjacent segment to join said segments to the split sprocket.

5. A sprocket assembly as set forth in claim 1 wherein the segments forming the split guide ring assembly are identical.

6. A sprocket assembly as set forth in claim 1 wherein said guide ring segments each include opposite ends and opposite sides, one side of one of said guide ring segments being positionable against one of the opposite sides of the sprocket such that the opposite side of said one of said guide ring segments faces away form the sprocket, each of the guide ring segments having one end including a recessed portion adapted to house an end of another guide ring segment in face-to-face nested relation.

7. A sprocket assembly as set forth in claim 6 wherein said opposite ends of each guide ring segment have a thickness of about one half of the thickness of the remainder of the guide ring segment such that when one end of one of said guide ring segments house an end of another guide ring segment in nested relation, the nested ends have a thickness approximately the same as the thickness of the remainder of the guide ring.

8. A sprocket assembly as set forth in claim 1 wherein the segments of the split guide ring assembly each include an inner portion positioned in face-to-face engagement with one of the sides of the sprocket and a flange portion integrally joined to the radially inner portion and extending radially outwardly therefrom, the flange portion being adapted to maintain a chain on the sprocket.

9. A sprocket assembly as set forth in claim 1 wherein the segments each have a center portion and opposite ends, the opposite ends having a thickness which is approximately one half the thickness of the center portion.

10. The sprocket assembly of claim 1 wherein the segments of the split guide ring assembly each have opposite ends, wherein each of said opposite ends contains an aperture, and wherein each of said ends of one of said segments is adapted to be housed in the aperture in one of said ends of another segment.

11. The sprocket assembly of claim 10 and further including a fastener extending through one of said segments to join said segments to the split sprocket.

12. A sprocket assembly comprising:
a sprocket having a circular body comprised of two separate semi-circular portions, said portions forming a periphery and each of said portions including an outer surface having radially extending teeth and a semi-circular inner surface which partially defines a central opening, and means for connecting said semi-circular portions together, and
a two piece guide ring assembly forming a guide ring on the periphery of the sprocket.

13. The sprocket assembly of claim 12 wherein said guide ring assembly is formed separately from said sprocket.

14. The sprocket assembly of claim 13 wherein said guide ring assembly is comprised of first and second portions with each of said portions having first and second ends and defining an arc of about 180°.

15. The sprocket assembly of claim 14 wherein one of said ends of said first portion is over one of said ends of said second portion and the other end of said first portion is positioned beneath the other end of said second portion.

16. The sprocket assembly of claim 14 wherein said first and second portions are identical.

17. The sprocket assembly of claim 14 wherein each of said first and second ends of each of said first and second portions contains an aperture, and wherein each of said first and second ends of each of said first and second portions is housed in the aperture in the ends of the other of said first and second portions.

18. The sprocket assembly of claim 17 and further including a fastener extending through one of said first and second portions to join said first and second portions to the split sprocket.

19. A split guide ring assembly for use with a sprocket having a generally circular configuration, the sprocket including a plurality of spaced apart teeth adapted to engage a chain, the sprocket including a central bore adapted to house a shaft such that the sprocket can be mounted on the shaft, and the sprocket including opposite sides, the opposite sides each having a periphery, the split guide ring assembly comprising at least two guide ring segments fixed to one of the opposite sides of the sprocket and adjacent to the periphery of the one opposite side, the guide ring segments being adapted to maintain the chain on the sprocket.

20. A split guide ring assembly as set forth in claim 19 wherein the guide ring segments of the split guide ring assembly each have opposite ends, one opposite end of one guide ring segment being adapted to be joined to an end of an adjacent guide ring segment in overlapping nested relation.

21. A split guide ring assembly as set forth in claim 20 and further including a fastner extending through said opposite end of one guide ring segment and said end of an adjacent ring segment to join said guide ring segments to the sprocket.

22. A split guide ring assembly as set forth in claim 19 wherein the guide ring segments forming the split guide ring assembly are identical.

23. A split guide ring assembly as set forth in claim 19 wherein said guide ring segments each include opposite ends and opposite sides, one side of each of said guide ring segments being adapted to be positioned against one of the opposite sides of the sprocket and the opposite sides of said guide ring segments facing away from the sprocket, each of the guide ring segments having one end including a recessed portion adapted to house an end of another guide ring segment in face-to-face nested relation.

24. A split guide ring assembly as set forth in claim 23 wherein said opposite ends of each guide ring segment have a thickness of about one half of the thickness of the remainder of the guide ring segment such that when said one end and said end of another guide ring segment are placed in nested relation, the nested ends have a thickness approximately the same as the thickness of the remainder of the guide ring segments.

25. A split guide ring assembly as set forth in claim 19 wherein the guide ring segments each include a radially inner portion positioned in face-to-face engagement with the side of the sprocket and a flange portion integrally joined to the radially inner portion and extending radially outwardly therefrom, the flange portion being adapted to maintain a chain on the sprocket.

26. A split guide ring assembly as set forth in claim 19 wherein the guide ring segments each have a center portion and opposite ends, the opposite ends having a thickness which is approximately one half the thickness of the center portion.

27. The split guide ring assembly of claim 19 wherein the guide ring segments each have opposite ends, wherein each of said opposite ends contains an aperture, and wherein an opposite end of one segment is adapted to be housed in the aperture in the end of an adjacent segment.

28. The split guide ring assembly of claim 24 and further including a fastener extending through one of said segments to join said segments to the split sprocket.

29. A guide ring assembly for a sprocket, said guide ring assembly comprising first and second interconnected portions, each of said first and second portions having first and second ends and each of said first and second portions defining an arc of about 180°.

30. The guide ring assembly of claim 29 wherein said guide ring assembly is formed separately from said sprocket.

31. The guide ring assembly of claim 29 wherein one of said ends of said first portion is over one of said ends of said second portion and the other end of said first portion is positioned beneath the other end of said second portion.

32. The guide ring assembly of claim 29 wherein said first and second portions are identical.

33. The guide ring assembly of claim 29 wherein each of said first and second ends of each of said first and second portions contains an aperture, and wherein each of said first and second ends of each of said first and second portions is housed in the aperture in the ends of the other of said first and second portions.

* * * * *